United States Patent [19]

Prinoth

[11] Patent Number: 4,573,746
[45] Date of Patent: Mar. 4, 1986

[54] TRACK FOR MOTOR VEHICLE HAVING TWO PARALLEL HALF-TRACKS

[76] Inventor: Erich Prinoth, Via Purger 181, 39046 Ortisei, Italy

[21] Appl. No.: 510,232

[22] Filed: Jul. 1, 1983

[30] Foreign Application Priority Data

Sep. 16, 1982 [IT] Italy ................ 23311 A/82

[51] Int. Cl.⁴ .......................................... B62D 55/24
[52] U.S. Cl. ............................. 305/35 EB; 305/57
[58] Field of Search ................ 305/35 EB, 38, 39, 57

[56] References Cited

U.S. PATENT DOCUMENTS

| | | | |
|---|---|---|---|
| 3,163,249 | 12/1964 | Ledohowski | 305/35 EB X |
| 3,694,040 | 9/1972 | Hallaman | 305/38 |
| 3,930,689 | 1/1976 | Maki | 305/35 EB |
| 4,278,302 | 7/1981 | Westimayer et al. | 305/35 EB |

Primary Examiner—David A. Scherbel
Attorney, Agent, or Firm—Roylance, Abrams, Berdo & Goodman

[57] ABSTRACT

A track for a motor vehicle including two track segments which are spaced apart and run parallel to each other in the longitudinal direction of the track. Both track segments have ribs extending outwardly therefrom which are arranged in rows transverse to the longitudinal direction of the track. The track also includes connecting members which extend between and connect the track segments. The connecting members are made of a rigid material and have a U-shaped cross-section. The connecting members are spaced between rows of the ribs. The ribs are of a greater height than the connecting members so only the ribs contact the road surface or ground. Alternating connecting members are positioned such that the first member extends from the outer edge of a first of the track segments to cover only a part of the second track segment while the next connecting member extends from the outer edge of the second track segment to cover only a portion of the first track segment. A drive gear engages the connecting members between the track segments.

10 Claims, 2 Drawing Figures

TRACK FOR MOTOR VEHICLE HAVING TWO PARALLEL HALF-TRACKS

SUMMARY OF THE INVENTION

A track for motor vehicles usable both on snow-free summer ground and on snow-covered winter ground, consisting of two parallel half-tracks extending longitudinally of the track and having ribs extending outwardly therefrom, the half-tracks being cross-wise connected by rigid U sections whose projecting height is lower than that of the ribs. The connecting sections function as transmission elements driven by a gear wheel.

DESCRIPTION OF THE INVENTION

This invention relates to a track for autovehicles usable both on snow-free summer ground and snow-covered winter ground.

It is known that auto vehicles prevailingly used in mountain zones, are preferably driven by tracks.

For example, very light vehicles like snowmobiles are provided with a rubber track having embedded reinforcements presenting a gripping profile. The drawback of this known solution is that it is suitable only for very light vehicles whose driving system do not transmit a very torque to the ground.

There are also known, in addition, course and path cutting vehicles with tracks equipped with metal elements radially projecting from an elastic track. Obviously, such a track is not adapted for running on snow-free summer grounds or over roads considering the noise created by the metal elements on the hard ground, the damage to the ground or road surface and the wear of the metal elements made preferably of aluminum. Another solution is known and used, for example, for tanks, using tracks made of metal links covered with a special wear-resisting rubber. Such a solution renders these tracks quieter when compared to a metal track, but the track used in this case is extremely heavy. This renders the life of the track because of the heavy load acting on the rubber and generated by the stiffness and hardness of the metal link resulting in rapid wear of the rubber layer.

It is the object of this invention to obviate the drawbacks of the preceding art and to propose to use on tracked motor vehicles to be employed both as multi-purpose vehicles and as vehicles for running on asphalted roads, a new track able to run on grounds and roads when snow-free in the summer and snow-covered in the winter and allowing in particular to transmit a high torque to the ground, guaranteeing at the same time the noise-free running on the vehicle without requiring the replacement of the track during the various seasons of the year.

According to this invention, these objects are reached by using tracks consisting of two parallel half-tracks extending longitudinally of the tracks and having ribs extending outwardly therefrom; the two half-tracks being connected in cross-wise direction by stiff sections whose projecting parts are lower than those of the ribs. The connecting sections function as in the space between the two half-tracks, transmission elements engaging a drive gear wheel.

Advantageously, the said sections are arranged between transverse lines of ribs projecting from the bottom of the track and are firmly fixed to the two half-tracks with screws or through-rivets.

Each of the cross sections are arranged such that they cross the full width of one of the half-tracks while covering only part of the other half-track. The intermediate space between the two half-tracks is advantageously bridged by the ends of all of the metal sections.

It is advantageous to provide a metal section with a larger cross section near center thereof and then gradually flattening out at the end away from the gear wheel.

The invention, will now be described in detail by describing an embodiment thereof by way of example without being limited thereto, and illustrated in the accompanying drawings in which.

Figure 1:
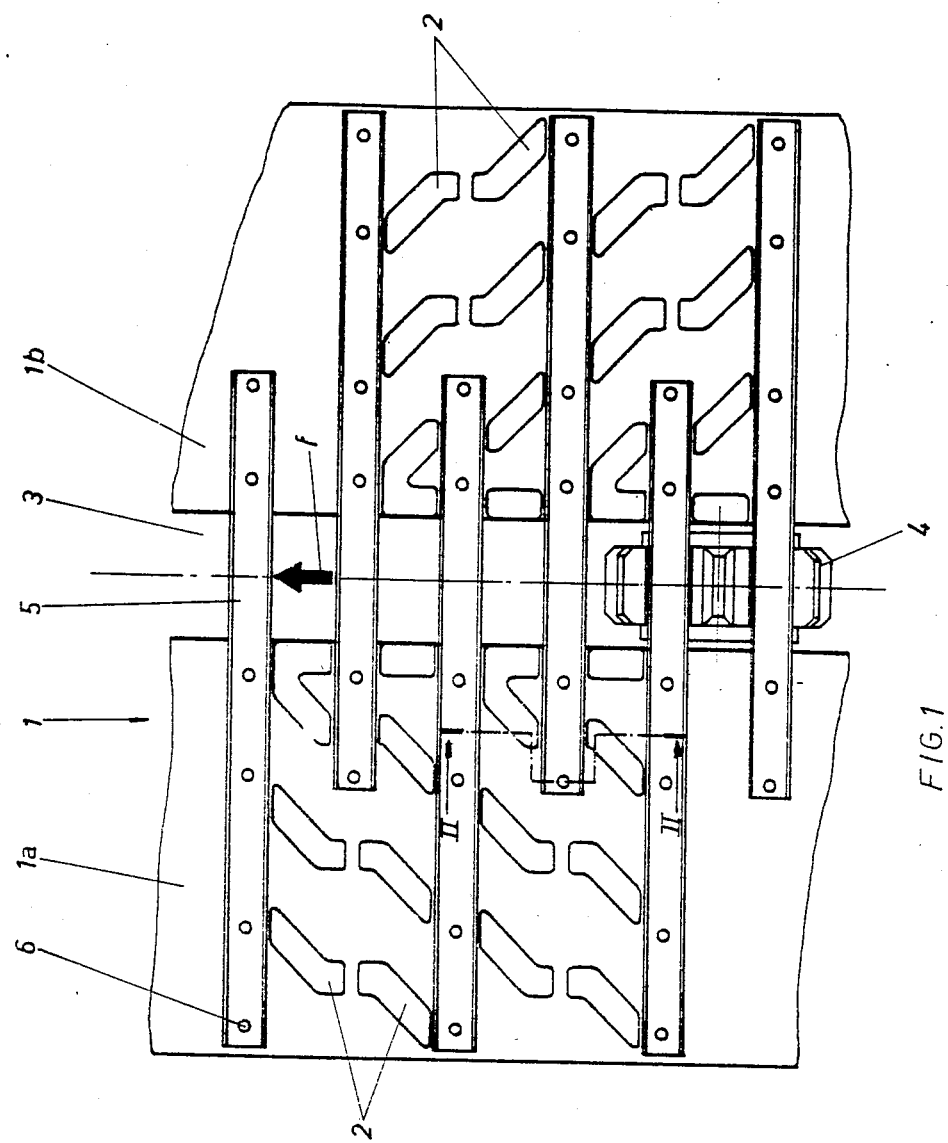
FIG. 1 is the plan view of a driving track consisting of two half-tracks.

As shown in FIG. 1, the track indicated by 1 consists of a first half-track 1a and of a second half-track 1b. The half-tracks 1a and 1b are made of an elastic material, for example of reinforced rubber, and include a belt portion having ribs 2 projecting outwardly therefrom. The ribs 3 project from the surface of the half-tracks 1a and 1b and are inclined with respect to the direction of motion f of the track 1. This allows an "arrow"-like profile; in addition, the inclined arrangement of the ribs 2 as shown in the figure ensures that possible snow masses are moved from the track center outward to the ends of the track. The two half-tracks 1a and 1b are spaced from another to form a free space 3. A gear wheel 4, driven by the vehicle engine (not shown) is located above space 3.

Figure 2:
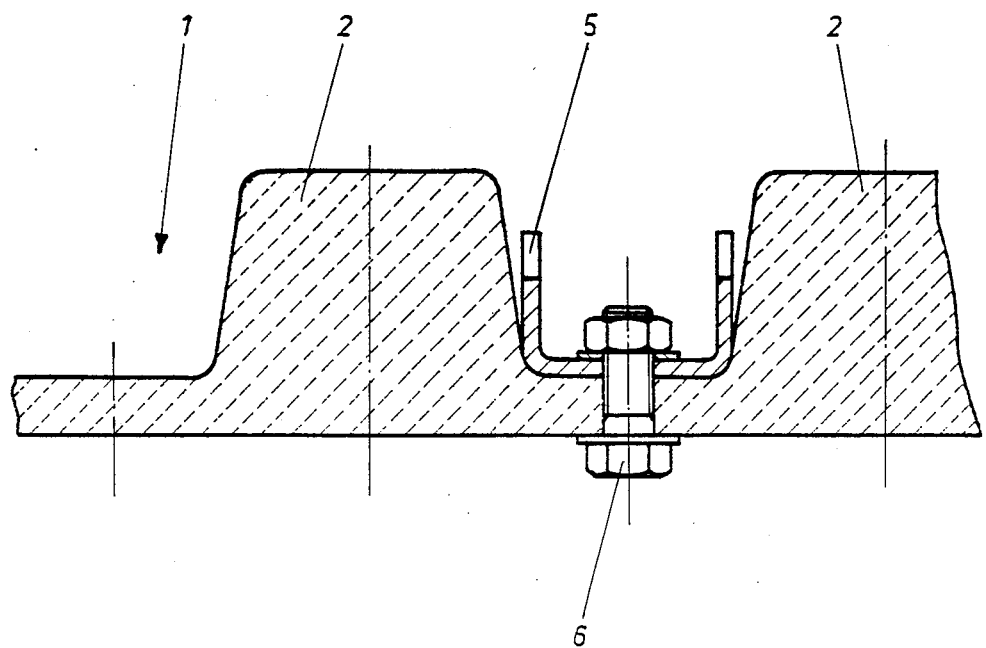
FIG. 2 shows, to an enlarged scale, a detail of the track in cross-section along line II—II of FIG. 1.

Sections 5, preferably U shaped, are used to firmly connect the half-tracks 1a and 1b together. As shown in FIGS. 1 and 2, the sections 5 and half-tracks 1a and 1b are preferably connected together with screws or through-rivets shown at 6. FIG. 1 shows clearly that the sections 5 are fixed cross-wise on the half-tracks 1a and 1b and are essentially perpendicular to the direction of motion f and that the said sections 5 are always located between one line of ribs 2 and the next line which, therefore, is spaced from the first line of ribs 2.

FIG. 1 shows still further that one section 5 extends the whole width of the half-track 1a but only part way across half-track 1b, while the next section 5 extends the whole width of the half-track 1b but only part way across the half-track 1a. This ensures a firm connection between the half-tracks 1a and 1b especially in most-stressed zone that is intermediate space 3 and which engages the drive gear wheel 4, while the remaining part of the half-track 1a or 1b is not fully occupied by the section 5 and is free to receive a maximum number of ribs 2 resulting in a larger elastic supporting and friction surface.

It is preferred to have the sections 5 at the position near the gear wheel 4 of a maximum height, while diminishing in height (or also in width) at the corresponding ends distanced from the drive gear wheel 4 and therefore mechanically less stressed. FIG. 2 shows in detail that the section 5, is positioned between the ribs 2 of the track 1, and is fixed to the half-sections by screws 6. It is obvious that rivets or other fixing means may be used. FIG. 2 further shows that the height of the ribs is considerably exceeding that of the arms of the U-section 5. This allows the ribs 2 to run silently over snow-free summer grounds without the danger of heavy wear because the loads are absorbed by the sections 5. In addition, there will be no troublesome noise because the sections 5 in general do not contact the ground. At the same time, it is possible to transmit a high torque to the half-tracks 1a and 1b through the gear wheel 4 and, due to the staggered arrangement of the sections, the half-tracks 1a and 1b do not lose their elasticity while transmitting and uniformly distribute considerable forces onto the track. The track 1 according to this invention and, due to the particular combination between two half-tracks 1a and 1b provided with a running surface with projecting ribs and to reinforcing and transmission metal sections arranged in a staggered manner transversely to the direction of running, is also exceptionally practical on snow-covered grounds, and in particular, when it is necessary to cross alternatively snow-covered parts and rocks or roads, possibly free from snow. The track 1 according to this invention, ensures in this case a noise-free and fast movement guaranteeing at any time an exceptional gripping force of the track.

It is preferred that the projecting ribs 2 taper off in height, thereby favouring elasticity and good gripping power on the ground. Still further, due to their arrow-like arrangement (about 45°) in the direction of the motion f of the vehicle, it is ensured that snow masses and mud do not block the profile, but are pushed by the half-tracks to the edges of the track.

When fitting a motor vehicle with tracks 1, according to this invention, it is for the first time possible to use the vehicle both in the winter and in the summer season without changing its tracks. The gear wheel 4 transmits a considerable torque to the half-tracks 1a and 1b with the said forces being transmitted uniformly and smoothly to the ground, because all the forces transmitted by the gear wheel are absorbed first by the metal section or metal elements 5 and distributed thereafter over the half-tracks or belts 1a and 1b, through the fixing means 6 firmly linking the transverse sections 5 with the half-tracks 1a and 1b. The track 1 according to this invention possesses the further advantage of not needing rigid inserts or embedded reinforcements in the half-tracks 1a and 1b. In addition, the replacement of the metal sections 5 and that of the reinforcing transmission half-tracks 1a and 1b is extremely quick and easy.

What I claim is:

1. An elongated track for a motor vehicle, comprising:

first and second spaced track segments, said segments being comprised of an elastic material, said segments forming two elongated parallel bands extending longitudinally of the track, each of said segments having inner and outer edges;

ribs projecting outwardly from each of said track segments, said ribs being formed of an elastic material, said ribs being aligned in rows transverse to the longitudinal direction of the track; and first and second connecting sections extending between and connected to said first and second track segments, said connecting sections having a continuous U-shaped cross-section, heights of said ribs exceeding heights of said connecting sections, said first connecting sections extending from the outer edge of said first track segment to and terminating at locations on the second track segment between said inner and outer edges thereof, said second connecting sections extending from the outer edge of said second track segment and terminating at locations on said first track segment between said inner and outer edges thereof, said first connecting sections alternating with said second connecting sections longitudinally along said track segments, one row of said ribs extending between adjacent ones of said connecting sections.

2. An elongated track according to claim 1 wherein said ribs include a first portion oriented at an acute angle to said connecting sections.

3. An elongated track according to claim 2 wherein said first portion angles outwardly from said inner edges towards said outer edges of said track segments.

4. An elongated track according to claim 1 wherein the height of the ribs tapers near said outer edges of said track segments.

5. An elongated track according to claim 1 wherein said track segments define a space therebetween and wherein a gear drive for the track is located adjacent said space.

6. An elongated track according to claim 5 wherein the gear drive engages the connecting sections in the space between the track segments.

7. An elongated track according to claim 1 wherein said connecting sections diminish in height near said outer edges of said track segments.

8. An elongated track according to claim 1 wherein said connecting sections diminish in width near said outer edges of said track segments.

9. An elongated track according to claim 1 wherein said connecting sections are oriented approximately perpendicular to the longitudinal direction of said track.

10. An elongated track according to claim 1 wherein said first connecting sections terminate less than half way across the second track segment and wherein said second connecting sections terminate less than half way across the first track segment.

* * * * *